United States Patent [19]

Yamamoto et al.

[11] Patent Number: 5,348,287
[45] Date of Patent: Sep. 20, 1994

[54] SHEET FEEDING APPARATUS USING A VIBRATION WAVE TO CONVEY SHEETS

[75] Inventors: Shinji Yamamoto, Tokyo; Yoshifumi Nishimoto, Yokohama, both of Japan

[73] Assignee: Canon Kabushiki Kaisha, Tokyo, Japan

[21] Appl. No.: 966,827

[22] Filed: Oct. 27, 1992

[30] Foreign Application Priority Data

Oct. 29, 1991 [JP] Japan .................................. 3-282924

[51] Int. Cl.$^5$ ............................................. B65H 5/12
[52] U.S. Cl. .................................. 271/267; 198/630; 310/323
[58] Field of Search .................. 271/8.1, 84, 267, 278; 310/323; 198/630

[56] References Cited

U.S. PATENT DOCUMENTS

| | | |
|---|---|---|
| 5,062,622 | 11/1991 | Kataoka et al. . |
| 5,065,999 | 11/1991 | Kataoka et al. . |
| 5,085,423 | 2/1992 | Nishimoto et al. . |
| 5,094,444 | 3/1992 | Seki ..................... 271/267 |
| 5,149,080 | 9/1992 | Yamamoto . |
| 5,155,407 | 10/1992 | Kimura et al. ............ 310/323 |
| 5,176,376 | 1/1993 | Igaki et al. . |

FOREIGN PATENT DOCUMENTS

| | | |
|---|---|---|
| 0298661 | 1/1989 | European Pat. Off. . |
| 0416884 | 3/1991 | European Pat. Off. . |
| 2193835 | 10/1990 | Japan . |
| 3093482 | 4/1991 | Japan . |

*Primary Examiner*—Robert P. Olszewski
*Assistant Examiner*—Boris Milef
*Attorney, Agent, or Firm*—Fitzpatrick, Cella, Harper & Scinto

[57] ABSTRACT

A sheet feeding apparatus in which vibration members of the running track type to form travelling waves are arranged in the vertical direction so as to face each other and a sheet sandwiched between them is fed by frictional forces is disclosed. In order to reduce the number of parts of a circuit to drive the upper and lower vibration members, the polarizing directions in the A-phase piezoelectric transducer portions of the piezoelectric transducers for the upper vibration member are opposite to the polarizing directions in the A-phase piezoelectric transducer portions of the piezoelectric transducers for the lower vibration member. Further, the polarizing directions in the B-phase piezoelectric transducer portions for the upper vibration member are the same as the polarizing directions in the B-phase piezoelectric transducer portions for the lower vibration member.

3 Claims, 8 Drawing Sheets

SHEET FEEDING APPARATUS USING A VIBRATION WAVE TO CONVEY SHEETS

BACKGROUND OF THE INVENTION

1. Field of the Invention

The invention relates to a sheet feeding apparatus which is provided to a printer, a facsimile apparatus, a copying apparatus, a typewriter, and other various machines each having a sheet feeding mechanism and which uses a travelling wave as a feeding force (conveying force).

2. Related Background Art

As a conventional mechanism to feed a sheet or the like using a vibration wave, there is a mechanism as shown in FIG. 2.

In FIG. 2, reference numeral 1 denotes a voltage controlled oscillator (VCO) which oscillates at a frequency that is four times as high as a driving frequency of an ultrasonic vibration member, which will be explained hereinafter. Reference numeral 2 denotes a ring counter for counting an output of the VCO 1 and for shifting the timings of the conductive states of switching transistors 4a to 4d at a frequency of ¼ of the output of the VCO 1 in a manner such that the phase of the switching transistor 4b is deviated by 180° from the phase of the switching transistor 4a, the phase of the switching transistor 4c is deviated by 90° from that of the transistor 4a, and the phase of the switching transistor 4d is deviated by 270° from that of the transistor 4a, respectively. Reference numerals 5a to 5c denote step-up transformers each for raising up to a voltage at which an ultrasonic vibration member can be sufficiently driven. The switching transistors 4a and 4b are connected to the primary side of the transformer 5a. There is a phase difference of 180° between the ON timings of the switching transistors 4a and 4b. Thus, a stepped-up AC wave of a frequency which is ¼ of the output frequency of the oscillator 1 is generated from the secondary side of the transformer 5a.

The switching transistors 4c and 4d are connected to the primary side of the transformer 5b. There is a phase difference of 180° between the ON timings of the switching transistors 4c and 4d in a manner similar to the case of the transformer 5a. On the other hand, the switching transistor 4c has a phase difference of 90° with respect to the switching transistor 4a. The switching transistor 4d also has a phase difference of 90° with respect to the switching transistor 4b. Consequently, an AC wave whose phase is deviated by 90° from the output of the transformer 5a is generated from the secondary side of the transformer 5b. On the other hand, the transistors 4a and 4b are connected to the primary side of the transformer 5c at the positions opposite to the connecting positions of the primary side of the transformer 5a. Therefore, an AC wave whose phase is deviated by 180° from the output of the transformer 5a is generated from the secondary side of the transformer 5c.

Reference numerals 11 and 12 denote elastic members by which a sheet 8 is sandwiched by a proper pressure. Piezoelectric transducers 6 (6a, 6b) and 7 (7a, 7b) are adhered to the surfaces of the elastic members 11 and 12 on the side opposite to the surfaces of the elastic members 11 and 12 which are in contact with the sheet 8. FIGS. 3A and 3B show a vibrator comprising the piezoelectric transducer 6 and the elastic member 11. Since another vibrator comprising the piezoelectric transducer 7 and the elastic member 12 also has substantially the same construction as the above vibrator, its description and drawing are omitted. FIG. 3A is a perspective view of the vibrator. FIG. 3B shows a polarization pattern of the piezoelectric transducer. In FIG. 3B, a segment containing a (+) polarizing direction which is opposite to that in a segment containing a (−). As described in JP-A-3-93482, the polarization pattern shown in the above-mentioned FIG. 3B is formed so that a gap of the polarization pattern exists in the node of the vibrating mode of each of the A phase and B phase. In the polarization pattern, electrodes $6a_1$ to $6a_5$ are referred to as A phase and electrodes $6b_1$ to $6b_5$ are referred to as B phase hereinafter. There is a positional deviation of ¼ wavelength between the A phase and the B phase. A travelling wave can be formed in the vibrator by delaying or progressing the AC wave which is applied to the B phase by 90° with respect to a time for the AC wave that is applied to the A phase. The progressing direction of the travelling wave is determined in dependence on whether the time phase difference of the B phase with respect to the A phase is delayed or advanced.

The driving principle of the sheet will now be described. FIG. 5 is a diagram showing the principle of the sheet feed. The convex portions of the travelling waves generated on the elastic members 11 and 12 are mutually overlapped. Such an overlapping state be realized by the following method. Namely, the directions of the travelling waves generated on the two upper and lower vibration members when the two elastic vibration members 11 and 12 having the same construction are arranged so as to face each other are set to the opposite directions. Further, a phase difference between the A phases of two vibration members is set to 180° and a phase difference between the B phases of two vibration members is set to 0°. In this instance, within each of the upper and lower vibration members, a phase difference between the A phase and the B phase is set so as to have a delay or advance of 90°. That is, when the A phase of the upper vibration member is used as a reference, there are the following two combinations (1) and (2).

(1) (upper A phase = reference,
  upper B phase = +90°,
  lower A phase = 180°,
  lower B phase = +90°)
(2) (upper A phase = reference,
  upper B phase = −90°,
  lower A phase = 180°,
  lower B phase = −90°)

The feeding directions of the sheet in case of the above combinations (1) and (2) are opposite. FIG. 2 shows a circuit which realizes the combination (2). On the other hand, in case of feeding the sheet 8 in both of the forward and reverse directions, the combinations (1) and (2) are switched by using a switch or the like.

When an attention is paid to a certain mass point (11a in FIG. 5) on the travelling wave generated as mentioned above, the mass point performs an elliptic motion by the travelling wave. For instance, when the travelling wave progresses to the right as shown by an arrow 13, the mass point 11a draws a clockwise elliptic orbit as shown in the diagram. Therefore, the moving direction of the mass point 11a on each of the elastic members 11 and 12 is opposite to the progressing direction of the travelling wave and functions as a feeding force to feed the sheet 8. On the other hand, in the concave portion, a sheet feeding force in the same direction as the progressing direction of the travelling wave is generated. However, since a pressure is smaller as compared with that in case of the convex portion, frictional forces between the sheet 8 and the elastic members 11 and 12 are small and the sheet feeding forces are also small. Consequently, the total force of the sheet feeding forces acts in the direction opposite to the progressing direction of the travelling wave mentioned above.

Reference numeral 9 denotes an encoder which sandwiches the sheet 8 together with a roller 10 and supplies the motion of the sheet 8 to a controller 3. The controller 3 determines a command value, practically speaking, a frequency to the oscillator 1 in accordance with the motion of the sheet 8, thereby controlling the position or speed.

The sheet feeding apparatus using the vibration wave as shown in FIG. 2 has advantages such that a transfer loss and gear noise or the like don't exist and highly accurate sheet feed can be realized as compared with a sheet feeding apparatus of the type in which a driving force from, for example, a motor or the like is transferred to a paper feed roller through a transfer mechanism such as a gear or the like.

However, two vibrators are used to feed the sheet. The AC waves having three kinds of phases are necessary to feed the sheet. Such a number of phases is larger than the number of kinds (two kinds) of phases which are generally necessary to drive one ultrasonic motor. Therefore, the number of transformers or the like is large. In addition, the price and size of the circuit are high.

SUMMARY OF THE INVENTION

It is an object of the invention to provide a sheet feeding apparatus for feeding a sheet by using two ultrasonic vibration members, in which the number of kinds of phases of AC waves which are applied to the two vibration members is reduced and the number of parts of a circuit is reduced, so that the costs of the circuit can be decreased and the circuit can be miniaturized.

The above and other objects and features of the present invention will become apparent from the following detailed description and the appended claims with reference to the accompanying drawings.

DETAILED DESCRIPTION OF THE PREFERRED EMBODIMENTS

Figure 1A:
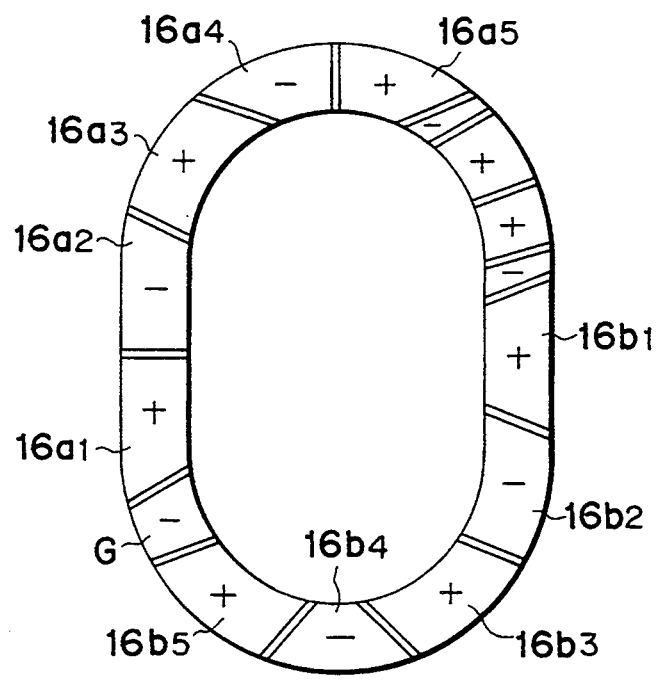
FIGS. 1A and 1B are diagrams showing polarization patterns of piezoelectric transducers in vibration members showing the first embodiment of a sheet feeding apparatus according to the invention.
Figure 1B:
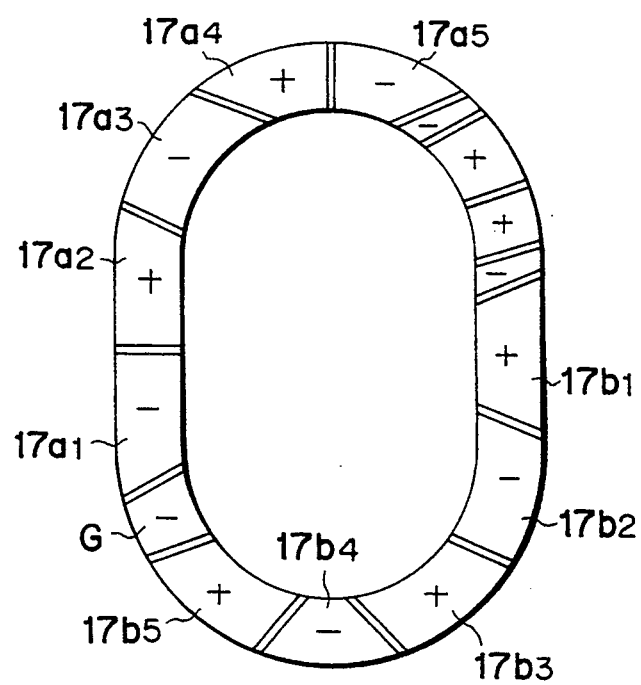
Figure 2:
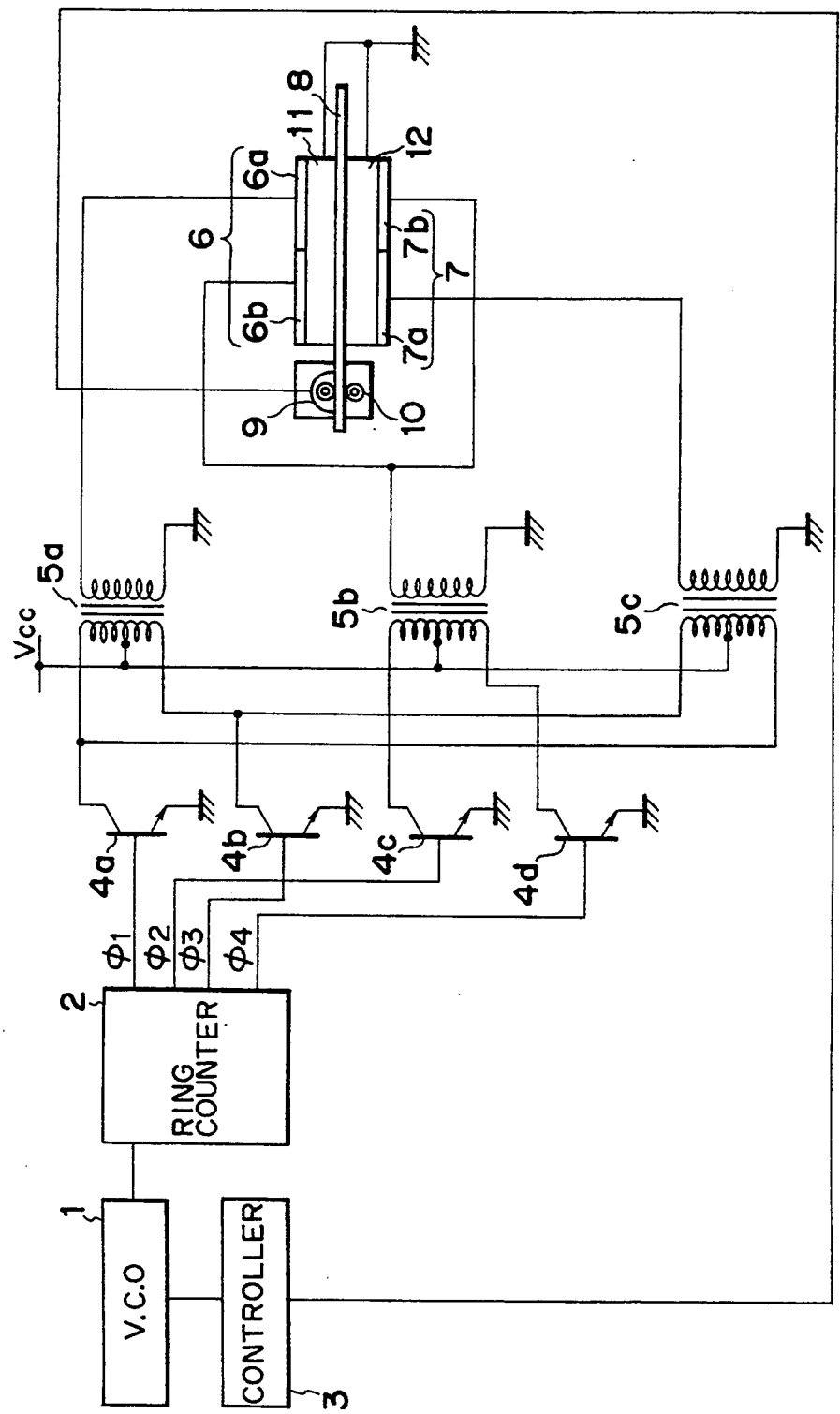
FIG. 2 is a block diagram of a conventional sheet feeding apparatus.
Figure 3A:
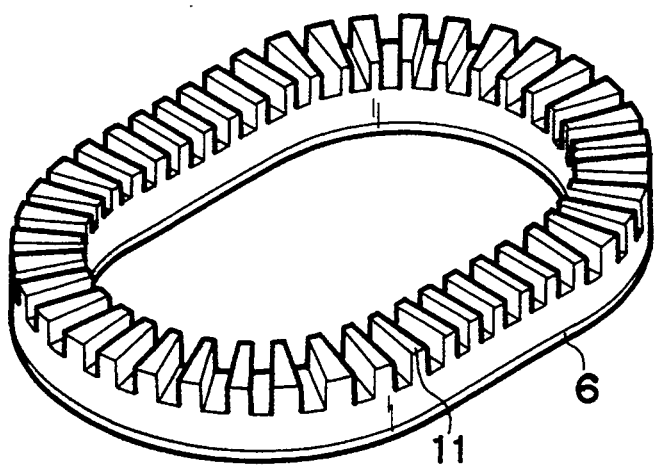
FIGS. 3A and 3B are diagrams showing a conventional vibration member.
Figure 3B:
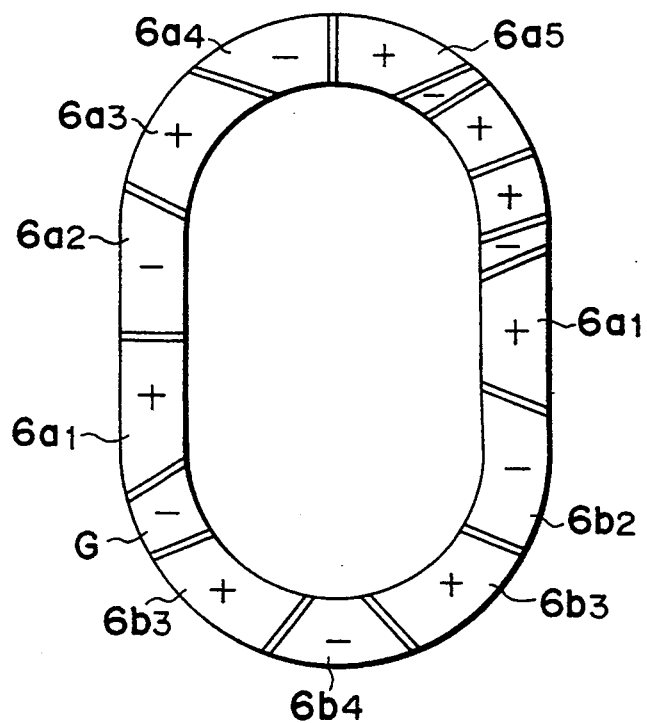
Figure 4:
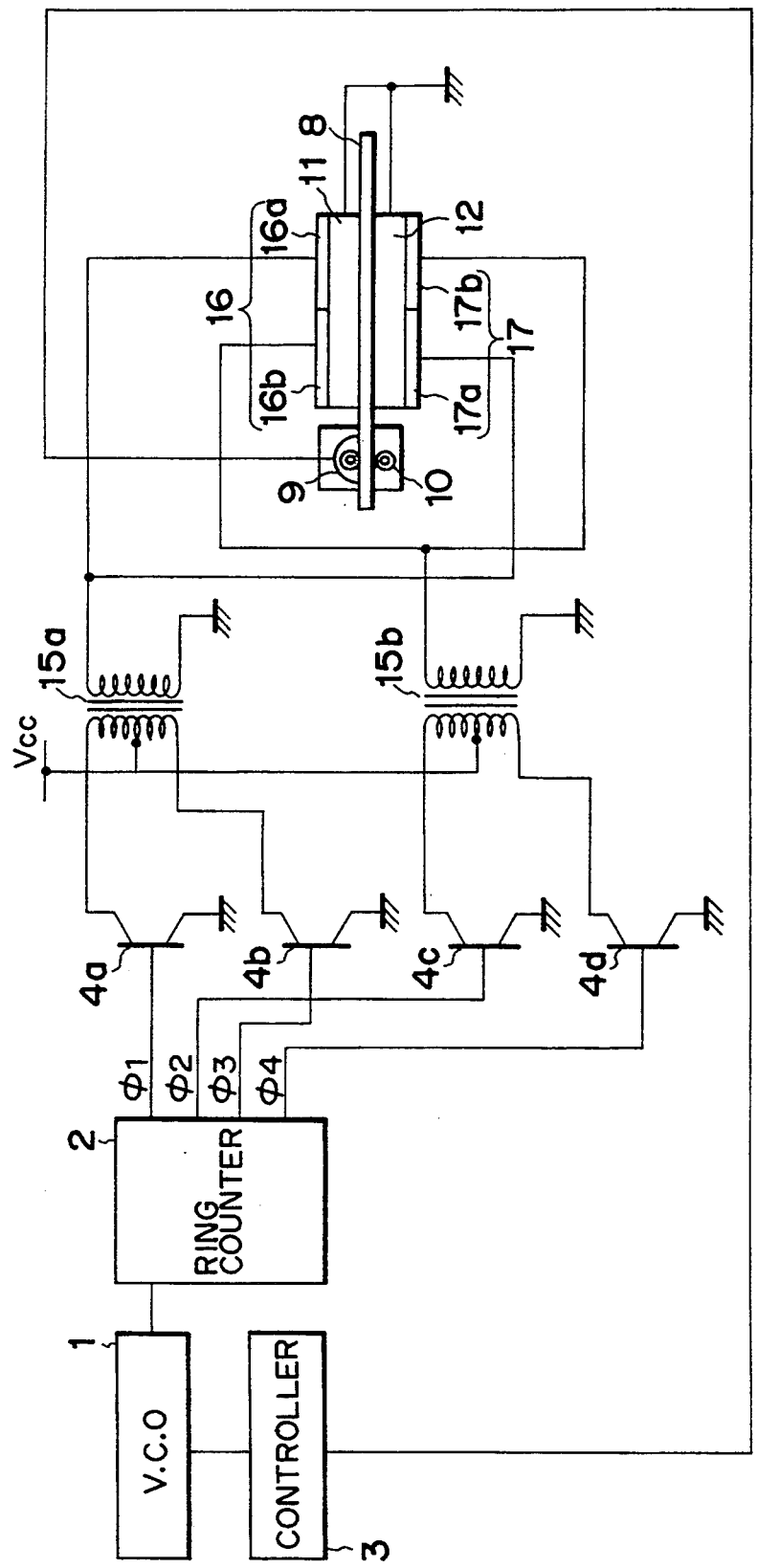
FIG. 4 is a block diagram of the first embodiment.

FIG. 4 is a block diagram showing the first embodiment of a sheet feeding apparatus according to the invention. FIGS. 1A and 1B are diagrams showing polarization patterns of vibration members shown in FIG. 4.

In a manner similar to the conventional apparatus, the sheet feeding apparatus of this embodiment has a construction such that hollow running track-shaped vibration members are arranged at upper and lower positions so as to face each other, and the sheet 8 is sandwiched between the vibration members and fed by frictional forces. The polarization patterns in the piezoelectric transducers of upper and lower vibration members 16 and 17 have constructions as shown in FIGS. 1A and 1B.

FIG. 1A shows the polarization pattern of the upper vibration member 16. FIG. 1B shows the polarization pattern of the lower vibration member 17. The lower vibration member 17 is arranged so that the piezoelectric transducer is located on the lower surface side of the elastic member 12. The upper vibration member 16 in which the piezoelectric transducer is provided on the upper surface of the elastic member 11 is arranged over the lower vibration member 17.

In the upper and lower vibration members 16 and 17 of the embodiment, the polarization patterns of the piezoelectric transducers are formed so as to have the same shape as shown in FIGS. 1A and 1B. Piezoelectric transducer portions $16a_1$ to $16a_5$ of the A phases of the upper vibration member correspond to piezoelectric transducer portions $17a_1$ to $17a_5$ of the A phases of the lower vibration member in the vertical direction. However, the polarizing directions of the polarization patterns in the corresponding upper and lower A-phase piezoelectric transducer portions are polarization processed in the opposite directions as shown in FIGS. 1A and 1B, respectively.

Piezoelectric transducer portions $16b_1$ to $16b_5$ of the B phases of the upper vibration member also correspond to piezoelectric transducer portions $17b_1$ to $17b_5$ of the B phases of the lower vibration member in the vertical direction. In this case, the polarizing directions of the corresponding upper and lower polarization patterns are polarization processed so as to have the same polarity, respectively, (refer to FIGS. 1A and 1B).

That is, in the A-phase piezoelectric transducer of the upper vibration member and the A-phase piezoelectric transducer of the lower vibration member, the directions of the polarization processes of the polarization patterns are opposite. Therefore, in case of applying the voltages of the same phase, the same effect as that the phase is deviated by 180° with respect to the time is derived.

Consequently, when the A phase of the upper vibration member is used as a reference, there are the following two kinds of phase relations between the voltages which are applied to the upper and lower vibration members in order to form the ideal travelling waves to feed the sheet.

(4) (upper A phase=reference,
 upper B phase= +90°,
 lower A phase=0°,
 lower B phase= +90°)
(5) (upper A phase=reference,
 upper B phase= −90°,
 lower A phase=0°, lower B phase = $-90°$)

When drive signals having electric phase differences as shown in the above items (4) and (5) are applied from the driving circuit as shown in FIG. 4, the feeding directions of the sheet 8 are made opposite.

As mentioned above, the AC waves which are necessary to drive the upper and lower vibration members can be commonly set respect to upper and lower A phases. Such AC waves can be commonly set with regard to upper and lower B phases. Thus, it is sufficient to merely generate two AC waves whose phases differ by only 90°.

FIG. 4 shows the driving circuit suitable to generate such AC waves for driving.

In the driving circuit shown in FIG. 4, the ring counter 2 is controlled by the signal from the voltage controlled oscillator (VCO) 1 and the switching transistors 4a to 4d are turned on and off at predetermined time intervals in a manner similar to the conventional apparatus. A different point is that the number of step-up transformers is changed to two, while three transformers are used in the conventional apparatus.

In this embodiment, the ring counter 2 generates signals to turn on the switching transistors 4a to 4d for periods of time of $\phi_1 = 0° - 90°, \phi_2 = 90° - 180°, \phi_3 = 180° - 270°$, and $\phi_4 = 270° - 360°$.

When the switching transistors 4a and 4b are turned on, a transformer 15a for the A phase is driven. When the switching transistors 4c and 4d are turned on, a transformer 15b for the B phase is driven. The AC waves of the same phase are applied to the upper and lower A phases. The AC waves of the same phase, although they have a phase deviation of 9° with respect to the time for the upper and lower A phases, are applied to the upper and lower B phases.

Figure 5:
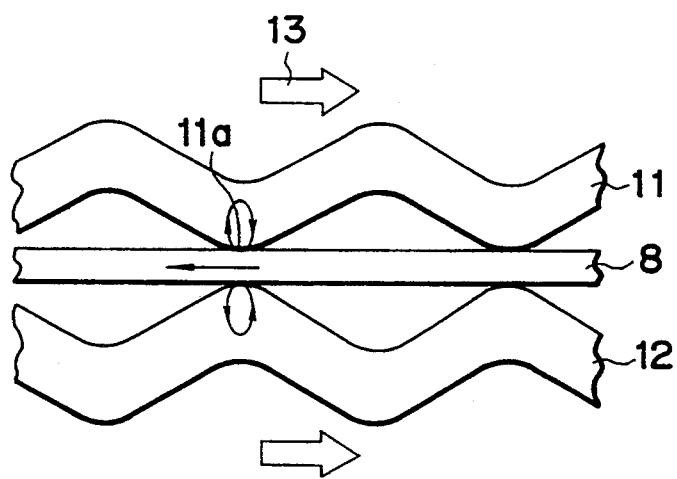
FIG. 5 is a diagram showing the principle of sheet feeding.

When the AC wave is applied to the upper vibration member (11, 16) so as to form, for example, a clockwise (when it is seen from the piezoelectric transducer side in FIGS. 1A and 1B) travelling wave, the progressing direction of the travelling wage generated on the lower vibration member 6. (12, 17) is set to be counterclockwise (when it is seen from the piezoelectric transducer side in FIGS. 1A and 1B) because the polarizing directions of the A phases $17a_1$ to $17a_5$ of the lower vibration member are opposite to those of the A phases $16a_1$ to $16a_5$ of the upper vibration member as mentioned above. The travelling waves in the same direction are formed on the surfaces of the elastic members of both of the vibration members on which the travelling waves are formed. Namely, travelling waves as shown in FIG. 5 are generated and can be fed on the sheet 8.

Figure 6A:
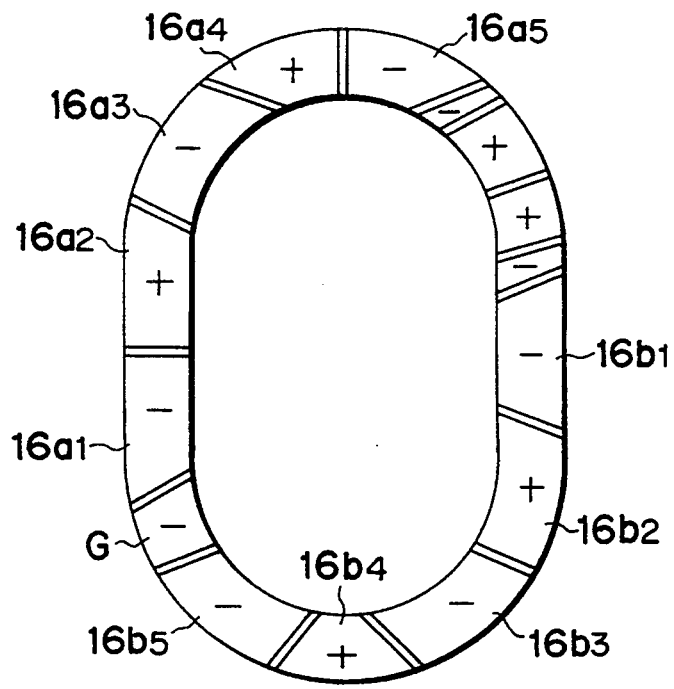
FIGS. 6A and 6B are diagrams showing polarization patterns of vibration members showing a modification of the first embodiment.
Figure 6B:
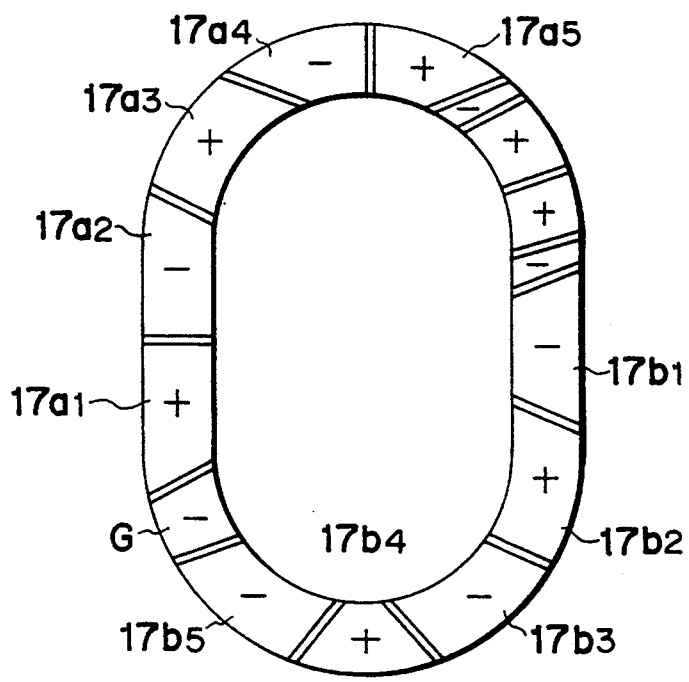

As shown in FIGS. 6A and 6B, a similar effect is also derived even when the polarizing directions of the piezoelectric transducers as electric/mechanical energy converting devices are set to be substantially opposite to the polarizing directions shown in FIGS. 1A and 1B.

Figure 7A:
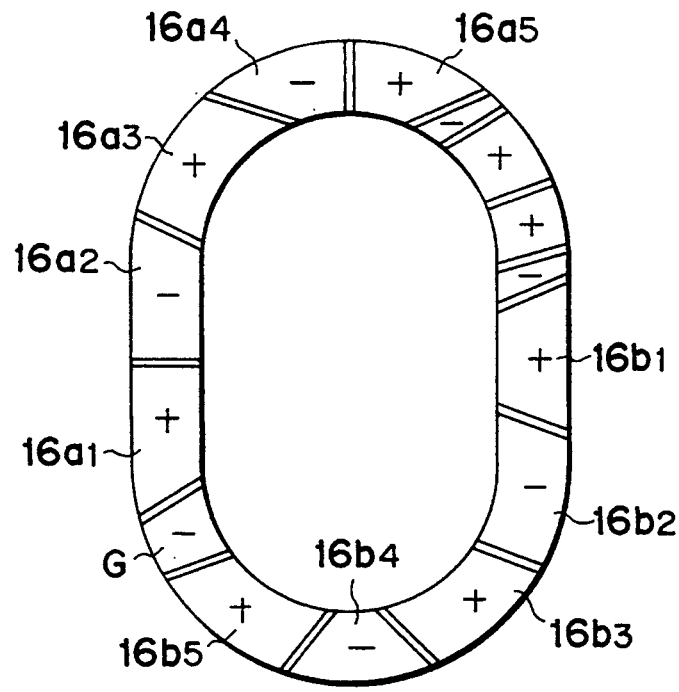
FIGS. 7A and 7B are diagrams showing polarization patterns of vibration members showing the second embodiment.
Figure 7B:
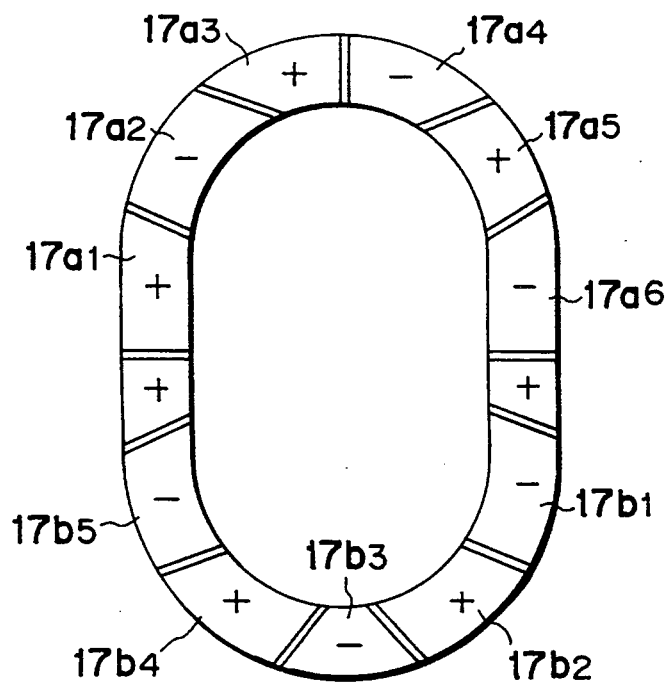

FIGS. 7A and 7B show the second embodiment and show polarization patterns and polarizing directions of the piezoelectric transducers ($16a_1, \ldots; 17a_1 \ldots$). FIG. 7A shows the polarization pattern of the piezoelectric transducers ($16a_1, \ldots, 16b_5$) of the upper vibration member 16. FIG. 7B shows the polarization pattern of the piezoelectric transducers ($17a_1, \ldots 17b_5$) of the lower vibration member 17. When comparing the second embodiment with the first embodiment, although the polarization patterns, that is, the segments of the electrodes of the piezoelectric transducers of the upper and lower vibration members are different, an effect similar to that in the first embodiment is obtained. The reasons will now be described hereinbelow with reference to FIGS. 8A and 8B.

Figure 8A:
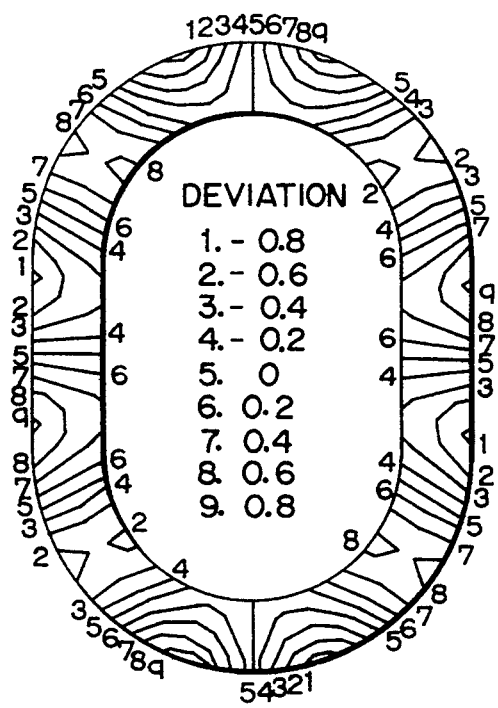
FIGS. 8A and 8B are diagrams showing vibrating modes in FIGS. 7A and 7B.
Figure 8B:
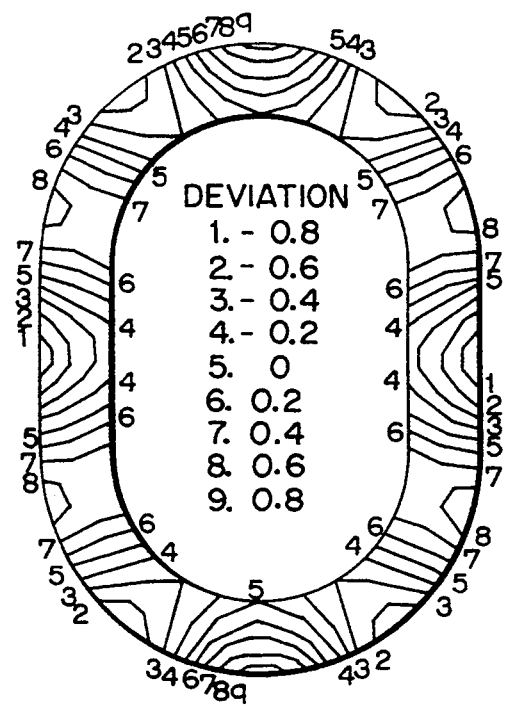

FIGS. 8A and 8B show vibration deviations occurring in the vibration members in two vibrating modes generated in the vibration member 16 or 17. That is, FIGS. 8A and 8B show the vibration deviations occurring in the vibration members when the A and B phases of the piezoelectric transducers provided on the vibration members are excited. FIG. 8A shows a vibration width occurring on the vibration member by the driving of the A phases. FIG. 8B shows a vibration deviation when the B phases are excited. In the diagrams, curves show contour lines of the vibration amplitudes. When comparing FIGS. 8A and 7A, the center portions of the electrodes of the A-phase piezoelectric transducer portions $16a_1$ to $16a_5$ coincide with the portions of high amplitudes of the vibrating mode of the A phases. Similarly, when comparing FIGS. 8B and 7A, it will be understood that the portions of high amplitudes of the B phases are included in the center portions of the electrodes of the B-phase piezoelectric transducer portions $16b_1$ to $16b_5$. Although the polarization patterns of the piezoelectric transducers in FIG. 7B differ from those shown in FIG. 7A, when comparing with the vibrating mode diagrams (FIGS. 8A and 8B), it will be understood that the patterns of $17a_1$ to $17a_6$ coincide with the mode of the A phases and the patterns of $17b_1$ to $17b_5$ coincide with the mode of the B phases. Among the electrodes ($16a_1 - 16a_5, 17a_1 - 17a_5$) for the A phases in FIGS. 7A and 7B, when the portions $16a_2$ to $16a_5$ and $17a_1$ to $17a_4$ at the corresponding positions are compared, it will be appreciated that the polarization polarities are opposite. Similarly, among the electrodes for the B phases in FIGS. 7A and 7B, when comparing the portions $16b_2$ to $16b_5$ and $17b_1$ to $17b_4$ at the corresponding positions, it will be also understood that the polarization polarities are the same. Consequently, since the vibrating stages have a relation similar to those in the first embodiment, the sheet 8 can be conveyed by a circuit construction as shown in FIG. 4.

As described above, as shown in FIGS. 7A and 7B, even when the polarization patterns of the piezoelectric transducers of two vibration members are different, the polarizing directions of one driving phase of the piezoelectric transducers, for instance, A phase set to be opposite with respect to two piezoelectric transducers; on the other hand, the polarizing directions of the other phase, for example, B phase are set to the same direction. Thus, the travelling waves generated on two vibration members can be set into the ideal relation with regard to the sheet feed by only the frequency voltages of two phases which are deviated by 90° from each other.

According to the invention as mentioned above, as for the polarization polarities of the electric/mechanical energy converting devices such as piezoelectric transducers of two vibration members which are used in the sheet feeding apparatus, by reversing only the first driving phase of one of the two vibration members, those two vibration members can be driven by only two kinds of AC waves in case of driving such two vibration members by one circuit. Thus, the number of parts such as transformers and the like can be reduced. The costs can be reduced. Further, the circuit can be miniaturized.

What is claimed is:

1. A sheet feeding apparatus comprising:
   (a) a first vibration member for feeding a sheet which is in contact therewith, said first vibration member including a first group of polarized electromechanical energy converting devices and a second group of polarized electromechanical energy converting devices; and
   (b) a second vibration member for feeding a sheet which is in contact therewith, said second vibration member including a first group of polarized electromechanical energy converting devices, each of which correspond in location within said second vibration member to an electromechanical converting device in the first group of said first vibration member, and a second group of polarized electromechanical energy converting devices,
   wherein the polarities of the converting devices of the first group of said first vibration member are opposite to the polarities of the corresponding converting devices of the first group of said second vibration member, and
   wherein each electromechanical energy converting device in the second group of said second vibration member corresponds in location within said second vibration member to an electromechanical energy converting device in the second group of said first vibration member, and wherein the polarities of the converting devices of the second group of said first vibration member are the same as the polarities of the corresponding converting devices in the second group of said second vibration member.

2. An apparatus for feeding a material, comprising:
   (a) a first vibration member for feeding a material in contact therewith, said first vibration member including a first group of polarized electromechanical energy converting devices and a second group of polarized electromechanical energy converting devices; and
   (b) a second vibration member for feeding the material which is in contact therewith, said second vibration member including a first group of polarized electromechanical energy converting devices, each of which correspond in location within said second vibration member to an electromechanical energy converting device in the first group of said first vibration member, and a second group of polarized electromechanical energy converting devices,
   wherein the polarities of the converting devices of the first group of said first vibration member are opposite to the polarities of the corresponding converting devices of the first group of said second vibration member and
   wherein each electromechanical energy converting device in the second group of said second vibration member corresponds in location within said second vibration member to an electromechanical energy converting device in the second group of said first vibration member, and wherein the polarities of the converting devices of the second group of said first vibration member are the same as the polarities of the corresponding converting devices in the second group of said second vibration member.

3. An apparatus according to claim 2, wherein travelling waves are generated in said first and second vibration members by the first and second groups of converting devices.

* * * * *

UNITED STATES PATENT AND TRADEMARK OFFICE
CERTIFICATE OF CORRECTION

PATENT NO. : 5,348,287
DATED : September 20, 1994
INVENTOR(S) : SHINJI YAMAMOTO, ET AL.

It is certified that error appears in the above-indentified patent and that said Letters Patent is hereby corrected as shown below:

<u>Column 5,</u>
line 8, "set" should read --set with--;
line 34, "9°" should read --90°--; and
line 41, "wage" should read --wave--.

Signed and Sealed this

Eighteenth Day of April, 1995

*Attest:*

BRUCE LEHMAN

*Attesting Officer*       Commissioner of Patents and Trademarks